Patented Jan. 22, 1929.

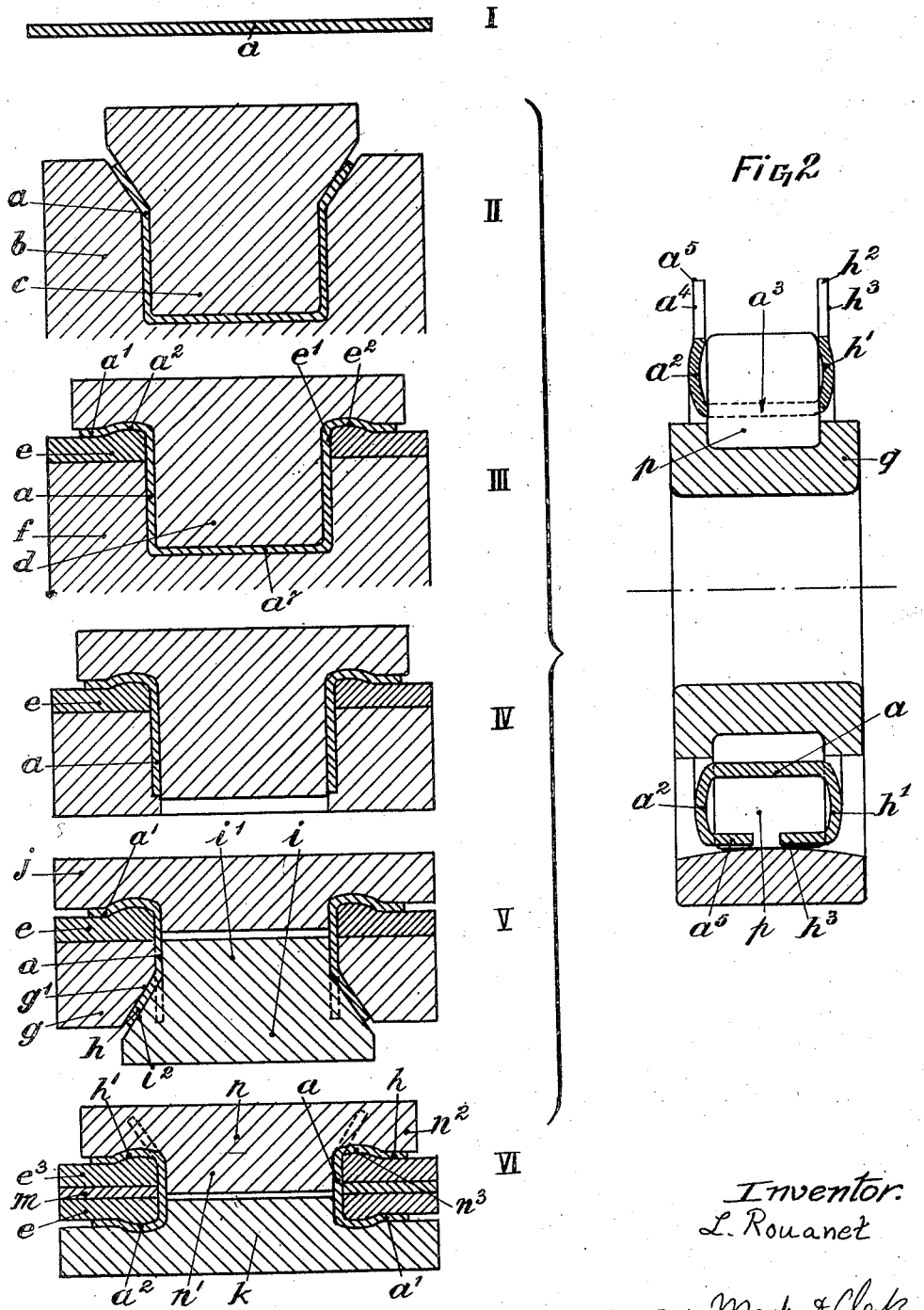

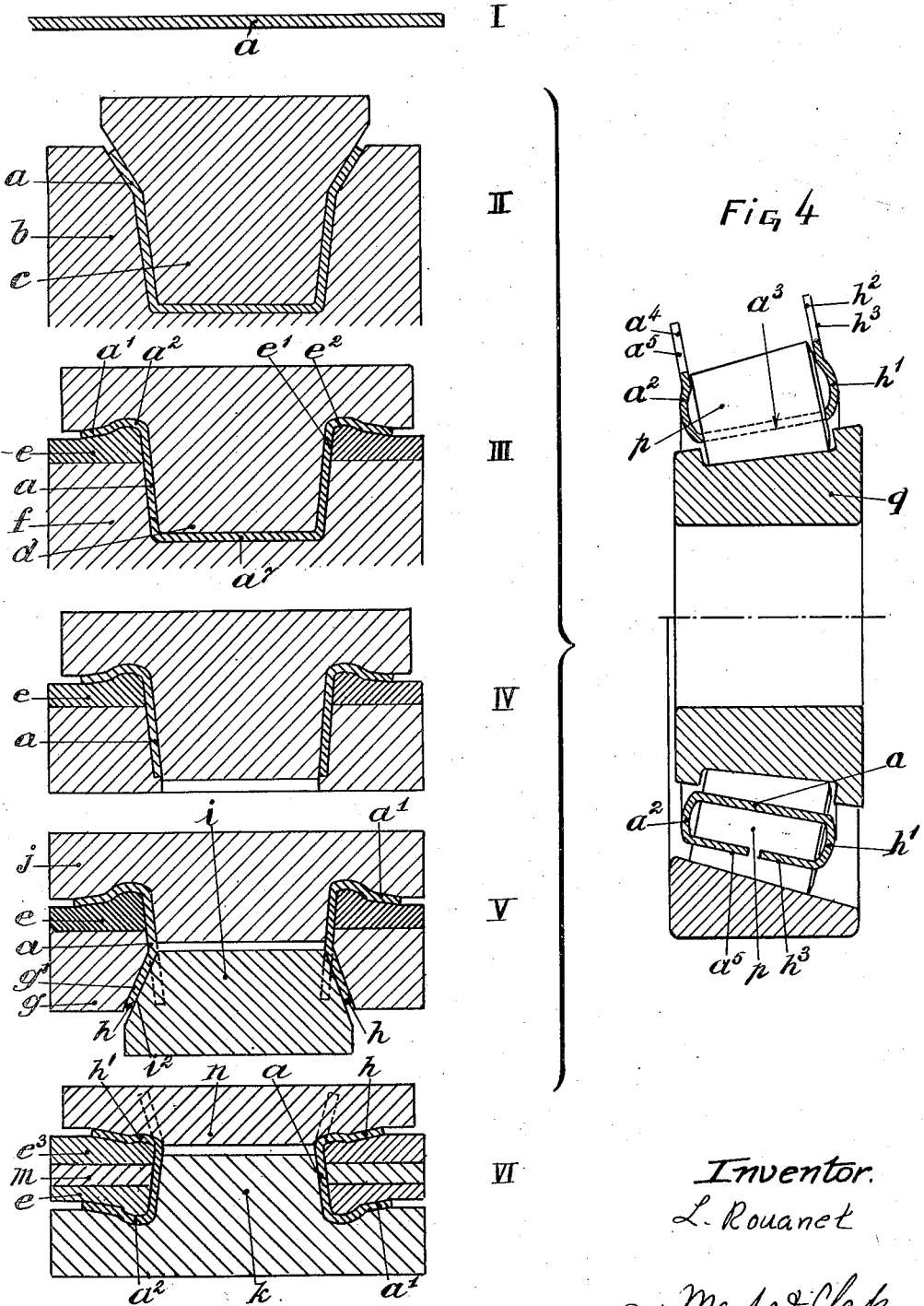

1,699,571

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE, A FRENCH COMPANY.

PROCESS OF MANUFACTURING BEARING CAGES.

Application filed June 26, 1925, Serial No. 39,845, and in France July 3, 1924.

The object of the present invention is to provide a process of manufacturing one piece sheet metal cages for roller bearings having either conical or cylindrical rollers. The invention also concerns the products manufactured according to the said process.

The process according to the invention enables cages of the said type for roller bearings with tapered or cylindrical rollers, to be obtained at a considerably reduced price, the products being formed by a series of stamping operations, starting with circular blanks punched out from metal sheets.

The invention will be clearly understood with reference to the accompanying drawing showing the different required operations for carrying out the process of the invention.

Fig. 1 shows diagrammatically the series of operations according to the process for manufacturing cages for bearings with cylindrical rollers.

Fig. 2 is an axial sectional view of a bearing with cylindrical rollers, showing at the top the product manufactured according to the process of Fig. 1 (with notches and radial openings punched out, the outer race of the bearing being removed), and showing at the bottom the finished cage with fingers bent in between the rollers.

Fig. 3 shows diagrammatically the series of operations according to the process for manufacturing bearings with tapered or conical rollers.

Fig. 4 is a view similar to that shown in Fig. 2 but showing a bearing with tapered or conical rollers.

In Fig. 1 a circular blank $a$ punched from a metal sheet is shown at I. This blank $a$ is brought in the usual way to the shape represented at II by one or several operations effected by means of a matrix or die $b$ and a punch $c$.

The step indicated at III shows the final shape of the flange $a^1$ of a cage for cylindrical rollers. It will be noted that the said flange $a^1$ is formed with an embossed part $a^2$ facilitating the stamping operation, strengthening both the flange and the whole of the cage, and greatly reducing the friction on the lateral faces of the rollers when operating in the bearing. The necessary tools consist in one punch $d$ and a compound die or matrix $e$ and $f$. The part $e$ of the die, which, when it is to be used for subsequent operations is also composed of several parts, is provided close to the bore $e^1$ with a circular bulge $e^2$ whereby the bulge $a^2$ is formed on the flange $a^1$.

At this point in the manufacture the bottom $a^7$ of the rough cage $a$ is punched out as represented at IV.

At V the rough cage $a$ is shown placed on a die composed of the element $e$ already used and a new element $g$ also formed of several parts and having a conical surface $g^1$ which commences the formation of the second flange $h$ on the cage. The punch $i$ has a cylindrical part $i^1$ and a frusto conical part $i^2$ of the same inclination as the part $g^1$ of the matrix $g$. The cage $a$ is guided by means of a suitably shaped support $j$ centered in the said cage $a$.

The operation by which the second flange $h$ is given its final form is represented at VI. The rough cage $a$ is centered on a support $k$ which may be the same as the support $j$ already used. The matrix is composed of the element $e$ employed before, of a second element $e^3$ identical with the said element $e$ and of a third element $m$ made up of two half rings located between the flat faces of the elements $e$ and $e^3$ so as to enable the removal of the whole of the matrix $e$—$m$—$e^3$. The punch $n$ used is formed with a cylindrical part $n^1$ centering in the cage $a$ and a circular flange $n^2$ with an annular hole $n^3$ which shapes the second flange $h$ of the cage with a bulge $h^1$ similar to the bulge $a^2$ on the flange $a^1$.

The cage being thus completely shaped by stamping operations, it is only necessary to punch out rectangular (or trapezoidal) openings radially disposed in the body $a$ of the said cage and serving as housings for the rollers, and to cut in the flanges $a^1$ and $h$ notches forming tongues or fingers bent in between the rollers when the outer race is inserted in the bearing.

It is to be understood that the radial openings $a^3$ (Fig. 2), in which the rollers $p$ located around the inner race $q$ of the bearing are distributed, as well as the notches $a^4$ between the tongues $a^5$, and the notches $h^2$ between the projections $h^3$, may be punched out between the operations indicated at IV and V without modifying the stamping process.

In Fig. 3, which shows the same operations, for manufacturing cages with tapered rollers, as those described in reference to Fig. 1 for manufacturing cages with cylindrical rollers, the same reference numbers designate the same tool parts. However, while the matrix element $e$ may be used as in Fig. 1 for performing the operations indicated at III, IV, V and VI, the element $e^3$ used at VI must be shaped differently from the element $e$ on account of the different inclinations of the body $a$ and the flanges $a^1$ and $h$ of the cage.

At II, III and IV, the punch $d$ instead of having a cylindrical end as in Fig. 1 is provided with a conical part the inclination of which must correspond to that of the rollers which will be guided and held in the finished cage.

In the operation illustrated at V, the punch $i$ is not provided with a cylindrical part. The tapered part $i^2$ of the punch $i$ commences, as in Fig. 1, the bending of the second flange $h$ on the cage, while the support $j$ centers the rough conical cage $q$ along a large part of its length.

In the operation shown at VI, the punch $n$ used to impart the final shape to the flange $h$ does not have any centering extension, and the tapered part of the support $k$ penetrates as far as possible into the corresponding tapered bore of the unfinished cage $a$.

The product obtained according to the method shown in Fig. 3 is represented at the top of Fig. 4, with the tapered rollers $p$ located in the radial openings $a^3$. At the bottom of the same figure the finished cage is shown with the tongues or fingers $a^5$ and $h^3$ suitably bent in between the tapered rollers $p$.

Claims—

1. A process of manufacturing cages for roller bearings from circular metal blanks consisting in pressing such blank in the form of a rough body having a circular wall, a bottom and a tapered flange at the other end, giving the said flange its final shape by stamping a circular bulge therein, punching out the bottom and forming another tapered flange at that end of the body, giving this flange its final shape by stamping a circular bulge therein, cutting openings into the straight part of the wall between the flanges and subsequently forming tongues in said flanges, and bending said tongues towards one another, substantially as described.

2. A process of manufacturing cages for roller bearings from circular metal blanks consisting in pressing such blank to the form of a rough body having a straight circular wall, a bottom and a flange at the end opposite the bottom, giving such flange its final shape by stamping a circular bulge in the central portion thereof, punching the bottom, forming rectangular openings in the straight circular wall, such openings extending till the rising portion of the formed flange and till a certain distance from the free end of the circular wall, forming in that end a tapered flange rising from the line joining the outer edges of the said openings, giving this flange its definite shape by stamping a circular bulge in its most central portion, forming tongues in the peripheral portions of the flanges and bending the said tongues towards one another, substantially as described.

3. A process of manufacturing cages for roller bearings from circular metal blanks consisting in pressing the blank into the form of an annular body having at one end a flange located substantially at right angles to the body and the central portion of which is circularly bulged, forming a second similar flange with a circularly bulged central portion at the other end of said body, forming openings in the annular body and cutting oppositely disposed notches in the peripheral portion of each flange so as to obtain distributed tongues into said portion and bending inwardly the tongues formed between the notches in said peripheral portions of the flanges.

4. A process of manufacturing cages for roller bearings from circular metal blanks consisting in pressing the blank into the form of an annular body with at one end a tapered flange, subsequently stamping the flange substantially at a right angle position to the body and forming in said flange a central and circular bulged portion while the peripheral portion remains plane, forming a second flange, similarly stamping in said second flange a central and circular bulged portion while the peripheral portion remains plane, forming openings in the annular body and cutting notches in the plane peripheral portions of the flanges, so as to obtain tongues distributed along said portions and subsequently bending inwardly the tongues formed between the notches of said peripheral portions.

5. A process of manufacturing cages for roller bearings consisting in stamping an annular body in a circular blank, enlarging the end portions of the annular body so that the angle of width is less than 180°, completing the enlargement of the peripheral portions of the flanges so formed so that same are in planes substantially at right angles to the annular body with, centrally in the flanges, bulged portions formed therein, said bulged portions extending externally, forming openings in the annular body between the rising portions of the flanges and cutting corresponding notches in the peripheral portions of same, so as to obtain tongues distributed along side portions and subsequently bending inwardly the tongues formed in the flanges between the said notches.

6. A process of manufacturing cages for roller bearings from circular metal blanks consisting in stamping therein an annular body of which the end portion is enlarged with the angle of enlargement less than 180°, completing the enlargement of the tapered flange by bending inwardly its central portion and externally its peripheral portion, thus forming a flange with a circular bulge adjacent the annular body and a plane ring externally disposed relative said bulge, similarly enlarging the other end portion of the annular body and completing the enlargement of the tapered flange so obtained by bending inwardly its central portion and outwardly its peripheral portion thus forming a second flange with a circular bulge adjacent the annular body and a plane ring externally disposed relative to said bulge, forming openings in the annular body and cutting corresponding notches with tongues between them in the peripheral plane rings of the flanges, the said openings extending till the rising portions of the flanges and the notches extending till the rising portions of the bulges, and subsequently bending towards one another the tongues formed between the said notches.

7. A process of manufacturing cages for roller bearings from metal blanks, consisting in pressing the blank into the form of an annular body, forming an inclined flange at each end of said body, stamping a circular bulge in the central portion of each flange while locating said flanges substantially at right angles to the body, cutting straight side openings in the annular body, cutting notches along the peripheral portion of the flanges so as to obtain distributed tongues into said portions and subsequently bending inwardly the tongues formed in the peripheral portions of the flanges.

LOUIS ROUANET.